United States Patent [19]

Morse

[11] Patent Number: 4,822,691

[45] Date of Patent: Apr. 18, 1989

[54] COPIER RESISTANT COATING FOR POLYVINYL CHLORIDE

[75] Inventor: David R. Morse, Haverhill, Mass.

[73] Assignee: Borden Inc., Columbus, Ohio

[21] Appl. No.: 132,027

[22] Filed: Dec. 14, 1987

Related U.S. Application Data

[62] Division of Ser. No. 56,314, May 29, 1987, Pat. No. 4,740,541.

[51] Int. Cl.$^4$ ............................................. B32B 27/30
[52] U.S. Cl. ...................................... 428/522; 428/520
[58] Field of Search ................................ 428/522, 520

[56] References Cited

U.S. PATENT DOCUMENTS

| | | | |
|---|---|---|---|
| 2,849,490 | 8/1958 | Evans | 524/40 |
| 2,860,110 | 11/1958 | Godshalk | 524/40 |
| 3,025,181 | 3/1962 | Nuessle et al. | 428/488 |
| 3,366,586 | 1/1968 | Crowley et al. | 428/463 |
| 3,429,840 | 2/1969 | Lowe, Jr. et al. | |
| 3,477,969 | 11/1969 | Parker et al. | |
| 3,671,293 | 6/1972 | Walle | |
| 3,758,428 | 9/1973 | Connelly et al. | 524/40 |
| 4,169,088 | 9/1979 | Hansen | |
| 4,227,042 | 10/1981 | Lueddecke et al. | 428/510 |
| 4,241,141 | 12/1980 | Jill | |
| 4,279,789 | 7/1981 | Leuddecke et al. | 428/379 |
| 4,366,300 | 12/1982 | Dolescluse | |
| 4,389,502 | 6/1983 | Fry et al. | |
| 4,423,100 | 12/1983 | Witman | 428/42 |
| 4,435,531 | 3/1984 | Nakayama et al. | |
| 4,446,259 | 5/1984 | Vasta | |

Primary Examiner—Edith Buffalow
Attorney, Agent, or Firm—Robbins & Laramie

[57] ABSTRACT

A coating composition is disclosed which comprises a methacrylic resin, a cellulose acetate butyrate resin, a solvent and optionally a slip additive. Polyvinyl chloride coated with this composition is resistant to the transfer of copier print.

10 Claims, No Drawings

COPIER RESISTANT COATING FOR POLYVINYL CHLORIDE

This is a division of application Ser. No. 56,314, filed May 29, 1987 now U.S. Pat. No. 4,740,541.

BACKGROUND OF THE INVENTION

1. Field of the Invention

The present invention relates to a coating composition for polyvinyl chloride (PVC) which inhibits the transfer of copier print into the PVC. The invention also relates to a coated PVC which is resistant to the transfer of copier print.

2. Description of the Prior Art

Printed matter which has been reproduced by copier machines is often stored in plasticized PVC binders, notebooks or folders. One problem which has been encountered with this practice is that the reproduced print will migrate or transfer into the PVC film. This migration or transfer of the reproduced print can damage the PVC film and may make the copied document illegible.

It is known that in the art that certain plasticizers can be used to minimize the migration from plasticized PVC into various substrates and chemicals. However, these plasticizers do not adequately inhibit the migration or transfer of copier print into PVC film.

Plasticized PVC has previously been coated to inhibit the transfer of dyes into PVC from leather or synthetic textiles. Although these coatings do inhibit dye migration from leather or synthetic textiles into PVC, they have been found unable to inhibit the transfer of copier print into PVC film.

Coating compositions have been prepared to resist the penetration of spots, stains, inks and the like. U.S. Pat. No. 4,169,088 describes an anti-grafitti, sealing solution. The solution comprises a polyvinyl alcohol resin, an acrylic resin and a zinc tetramine complex. The acrylic resin contains 1.5 to 10% carboxyl groups and a methyl methacrylic base. The polyvinyl alcohol resin and acylic resin are cross-linked together by heat.

U.S. Pat. No. 4,241,141 describes a coating composition which is resistant to felt-tipped marking pens. The coating composition comprises water, a resin and optionally a plasticizer, a coalescing solvent, and defoamers. The resin which is solubilized by an alkali metal hydroxide comprises 25% to 75% by weight of a hard monomer, 15% to 50% by weight of a soft monomer and 15% to 30% by weight of an acid monomer. Suitable monomers include alkyl methacrylates as the hard monomer and alkyl acrylates or high alkyl methacrylates as the soft monomer.

U.S. Pat. No. 4,366,300 discloses a coating composition for walls, stones, concrete, etc., which protects against contaminations, stains or spots. The composition comprises a solvent, a fluorinated resin based on an acrylic or methacrylic ester of a fluorinated sulfonamide-alcohol and an adjuvant selected from an aminoplast resin or a thermoplastic resin or a wax.

The present invention provides a coating composition for PVC film which renders the film resistant to copier print transfer.

SUMMARY OF THE INVENTION

The present invention comprises a coating composition for PVC which will inhibit the transfer of copier print into the PVC. The invention further comprises a coated PVC.

The coating composition comprises 90–96 parts by weight of a methacrylic resin, 4–10 parts by weight of a cellulose acetate butyrate resin, and a solvent. The composition optionally comprises a slip or anti-tacking agent such as a silicone resin or a wax.

PVC is coated with the coating composition and the solvent is removed. The coated PVC is resistant to the transfer of copier print.

DETAILED DESCRIPTION OF THE INVENTION

The present invention is directed to a coating composition for PVC which renders the PVC resistant to the transfer of copier print into the PVC. The invention is further directed to the coated PVC. The coating composition comprises a methacrylic resin, a cellulose acetate butyrate resin and a solvent. The composition may optionally contain a slip or anti-tacking agent.

The methacrylic resin component comprises 90–96 parts by weight of the coating composition. It is preferred to use 92 parts by weight. The methacrylic resin may be a methyl methacrylate resin, an ethyl methacrylate resin or a methacrylate copolymer. The methacrylic resin is preferably a methyl methacrylate resin. The molecular weight and viscosity of the resin is not critical, but it is preferred to utilize a medium to high molecular weight resin. Methacrylic polymers are well known and commercially available.

The cellulose acetate butyrate resin comprises 4–10, preferably 8, parts by weight of the coating composition. It has been found that the cellulose acetate butyrate (CAB) resin is the critical component of the invention. If the CAB resin is used in too low an amount, the coated film will now be resistant to copier print transfer. If the CAB resin is used in too high an amount, PVC coated in the resultant composition will not be capable of being heat-sealed. Consequently, it is desirable to stay within the general range discussed above.

Many CAB resins are well-known and commercially available. It is preferred to use a resin which has an acetyl content of 10–20%. It is preferred that the resin has an acetyl content of 13%. The molecular weight and viscosity of the CAB resin is not critical, although it is preferred to use a moderately low viscosity resin.

The solvent component is utilized primarily as a vehicle to carry the coating composition to the PVC. The solvent is selected so that as much solids can be dissolved as possible at the lowest viscosity, in order to maintain a thin coating. The methacrylic resin is the most difficult component to dissolve. Thus, solvents which are capable of dissolving the methacrylic resin are generally suitable for preparing the coating composition. Suitable solvents include, but are not limited to, methyl ethyl ketone, acetone, dimethyl formamide, methylene chloride, tetrahydrofuran and toluene. It is preferred to use methyl ethyl ketone. Generally, 500–900 parts by weight of solvent are used. Preferably, 700–750 parts by weight of solvent are utilized.

The coating composition can optionally contain a slip or anti-tacking agent. Conventional anti-tacking or slip agents can be used in the present composition. Examples of such agents include silicon resin and waxes. It is preferred to use a silicone resin. An example of a suitable silicone resin is polydimethylsiloxane. The slip or anti-tacking component's primary function is to increase the ease of handling the coated PVC. It does not affect the composition unless too much is utilized. Then, a detrimental affect on the copier print resistance is noted. 0–0.25 parts by weight, preferably 0.15 parts by weight, of the slip or anti-tacking agent are utilized in the coating composition.

The coating composition should be prepared so that it is clear and free from haze. Any technique of combining the components of the coating composition may be used, as long as the goal is met. One method which has been found to accomplish suitable preparation of the composition is as follows. 70% of the solvent is added to the mixing vessel of a reversible homogenizer. The methacrylic resin, cellulose acetate butyrate resin and slip additive, if present, are added slowly to the solvent with the homogenizer in the downward mode. The homogenizer is reversed to the upward mode and the remaining solvent is added.

The coating composition is applied to the PVC using any technique which is capable of applying a uniform coating to the PVC. The PVC films which are to be coated are calendered films which may be 0.008–0.016 inches thick. Other thicknesses of film are also suitable for use with the present coating composition. Both clear and opaque films may be coated by the present composition. The films are any generally used in the industry and consist of a PVC resin, plasticizers for flexibility and other additives. The films are catgorized as semi-rigid to medium flexibility with plasticizer levels of 20–45 parts per hundred parts of resin. Generally, 0.04–0.10, preferably 0.08, pounds of the wet coating composition is applied per square yard of the PVC. The coated PVC is then treated so that the solvent is evaporated. It is desired that a uniform coating having a depth of 0.00012–0.0004 inches, preferably 0.0003 inches, be laid on the PVC. One side, or both sides of the PVC may be coated in this manner.

One method which has been found suitable for the application of the coating composition to the PVC is a rotogravure process. In this process, the coating composition is applied to the PVC using an engraved roller on an in-line rotogravure printing press. The roller has an 85 line quadrangle configuration with a cell depth of 0.0050 inches. Alternatively, two engraved rollers in series on an in-line rotogravure printing press may be used to coat the PVC film. In this instance, the rollers have a 120 line quadrangle configuration with a cell depth of 0.0032 inches. It may be necessary to apply more than one coating to obtain the necessary depth.

The present invention will be further described by reference to the following non-limiting examples. In these examples, all parts are by weight unless otherwise indicated.

EXAMPLE 1

A coating composition was prepared using the following components:

| Component | Parts |
|---|---|
| Elvacite 2041 | 92 |
| CAB-381-0.5 | 8 |
| Methyl ethyl ketone | 733 |

Elvacite 2041 is a trademark of DuPont for a very high molecular weight methyl methacrylate resin. CAB-381-0.5 is a trademark of Eastman Chemical Products, Inc., for a moderately low viscosity cellulose acetate butyrate resin having a 13 average weight % of acetyl groups and a 37 average weight % of butyryl groups.

The composition was prepared by adding 513 parts of the methyl ethyl ketone to the mixing vessel of an Arde Barinco reversible homogenizer. The resin components were slowly added to the mixing vessel in the downward mode. The mixing in this mode was carried out for twenty minutes. The homogenizer was then reversed to the upward mode and mixing continued until the solution temperature reached 115° F. The remaining methyl ethyl ketone was then added and mixed for five minutes. The composition had a viscosity of 50 seconds using a number 2 Zahn cup and a 12% solids content.

EXAMPLE 2

A coating composition was prepared using the following compounds:

| Component | Parts |
|---|---|
| Elvacite 2041 | 92 |
| CAB-381-0.5 | 8 |
| SE-76 | 0.15 |
| Methyl ethyl ketone | 733 |

SE-76 is a trademark of General Electric Company for a polydimethylsiloxane resin. The coating composition was prepared as described in Example 1. The silicone resin was added with the other resin components. The composition had a solids content of 12% and a viscosity of 50 seconds as measured using a number 2 Zahn cup.

EXAMPLE 3

The coating compositions prepared in Examples 1 and 2 were applied to PVC and tested for inhibition of copier print transfer. Each coating composition was applied using a #12 wire-wound drawn-down bar to a plasticized PVC sheet which had previously been calculated. The solvent was removed and the coated PVC was cut into two-inch squares.

Printed material reproduced by a Xerox 3100 and a Ricoh FT 40–60 copier was cut into two-inch squares and placed against the coated PVC film. Uncoated PVC film was used as the control. The sandwich was placed between two glass plates with a two pound weight (0.5 psi). Aging was conducted in a forced hot-air oven at 120° F. for five days. The sandwich was then removed from the oven and the copied print separated from the PVC. The uncoated PVC showed complete transfer of the copied print. The PVC coated with the compositions of Examples 1 and 2 showed negligible print transfer. The composition of Example 2 was slightly better than the composition of Example 1.

EXAMPLE 4

The coating composition of Example 2 was applied to thirty yards of clear PVC which had previously been calendered. The PVC contained 34 parts of plasticizer per hundred parts of resin and was 0.010 inch thick and 54 inches wide. The coating composition was applied to the PVC using an 85-line quadrangle configuration engraved roller on an in-line rotogravure printing presse. The roller has a cell depth of 0.0050 inches. The coated PVC was tested as described in Example 3. The coated PVC showed negligible print transfer.

EXAMPLE 5

The above example was repeated using two 120-line quadrangle configuration engraved rollers in series on an in-line rotogravure printing press. The rollers had a cell depth of 0.0032 inches. Again, the coated PVC showed negligible print transfer.

While the invention has been described in connection with specific embodiments thereof, it will be understood that it is capable of further modifications. This application is intended to cover any variations, uses or adaptations of the invention following, in general, the principles of the invention and including such departures from the present disclosure as come within known and customary practice within the art to which the invention pertains.

What is claimed is:

1. A coated polyvinyl chloride film which comprises a polyvinyl chloride film and a coating consisting essentially of
   (a) 90-96 parts by weight of a methacrylic resin,
   (b) 4-10 parts by weight of a cellulose acetate butyrate resin, and
   (c) 0.0-0.25 parts by weight of a slip additive.

2. The coated polyvinyl chloride film of claim 1, which comprises a polyvinyl chloride film and a coating consisting essentially of
   (a) 92 parts by weight of a methacrylic resin,
   (b) 8 parts by weight of a cellulose acetate butyrate resin, and
   (c) 0.15 parts by weight of a slip additive.

3. The coated polyvinyl chloride film of claim 1, wherein said methacrylic resin is a methyl methacrylate resin.

4. The coated polyvinyl chloride film of claim 2, wherein said methacrylic resin is a methyl methacrylate resin.

5. The coated polyvinyl chloride film of claim 1, wherein said slip additive is selected from the group consisting of silicone resins and waxes.

6. The coated polyvinyl chloride film of claim 2, wherein said slip additive is selected from the group consisting of silicone resins and waxes.

7. The coated polyvinyl chloride film of claim 1, wherein said slip additive is a silicone resin.

8. The coated polyvinyl chloride film of claim 2, wherein said slip additive is a silicone resin.

9. A coated polyvinyl chloride film which comprises a polyvinyl chloride film and a coating comprising essentially of
   (a) 90-96 parts by weight of a methyl methacrylic resin,
   (b) 4-10 parts by weight of a cellulose acetate butyrate resin, and
   (c) 0.0-0.25 parts by weight of a silicone resin.

10. The coated polyvinyl chloride film of claim 9, which comprises a polyvinyl chloride film and a coating consisting essentially of
    (a) 92 parts by weight of a methyl methacrylic resin,
    (b) 8 parts by weight of a cellulose acetate butyrate resin, and
    (c) 0.15 parts by weight of a silicone resin.

* * * * *